July 11, 1933. W. W. CARSON, JR 1,917,698
PRESSURE CONTROLLED VALVE
Filed Oct. 8, 1928 3 Sheets-Sheet 1
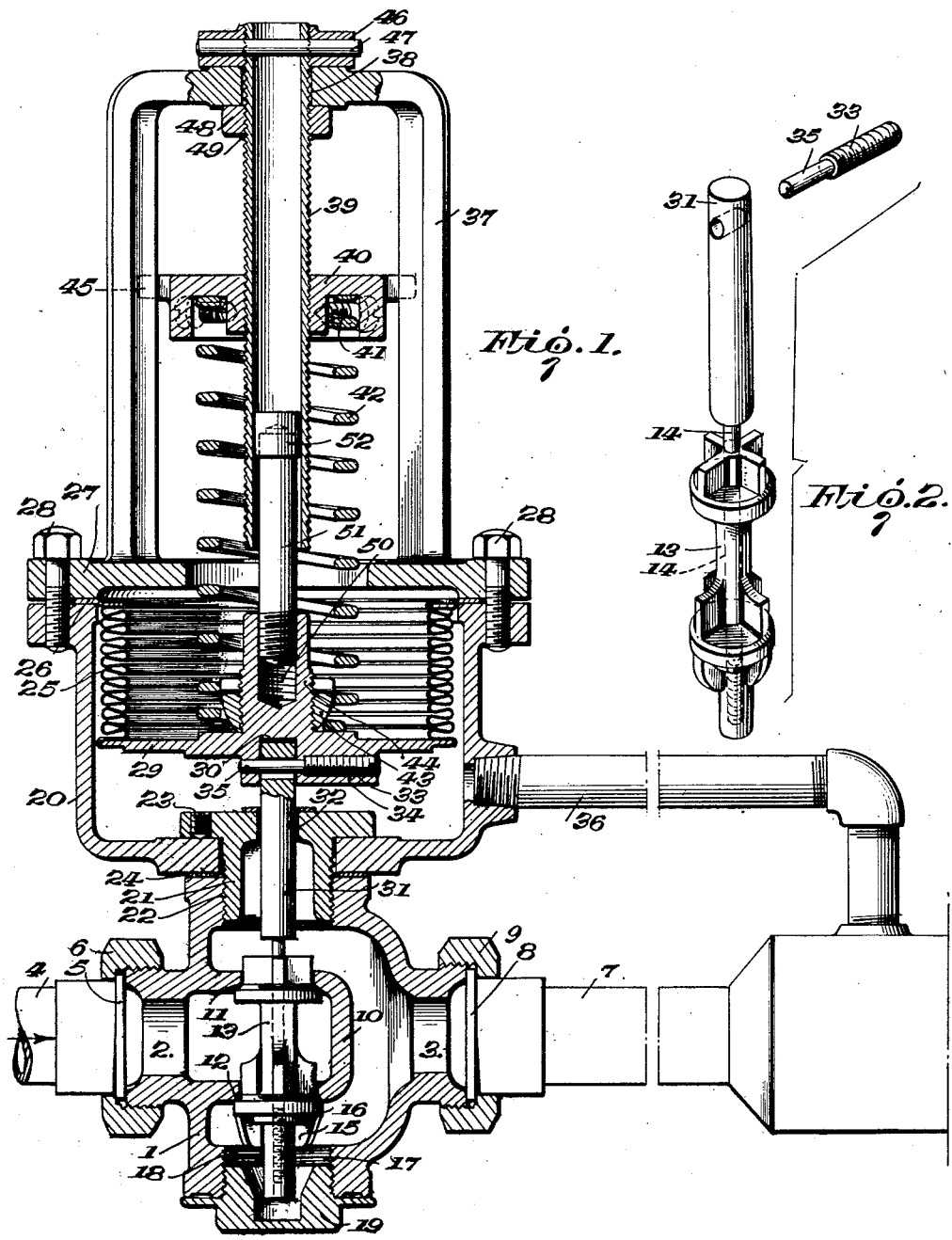
Inventor
William W. Carson, Jr.
By
Cameron, Kerkam and Sutton.
Attorney

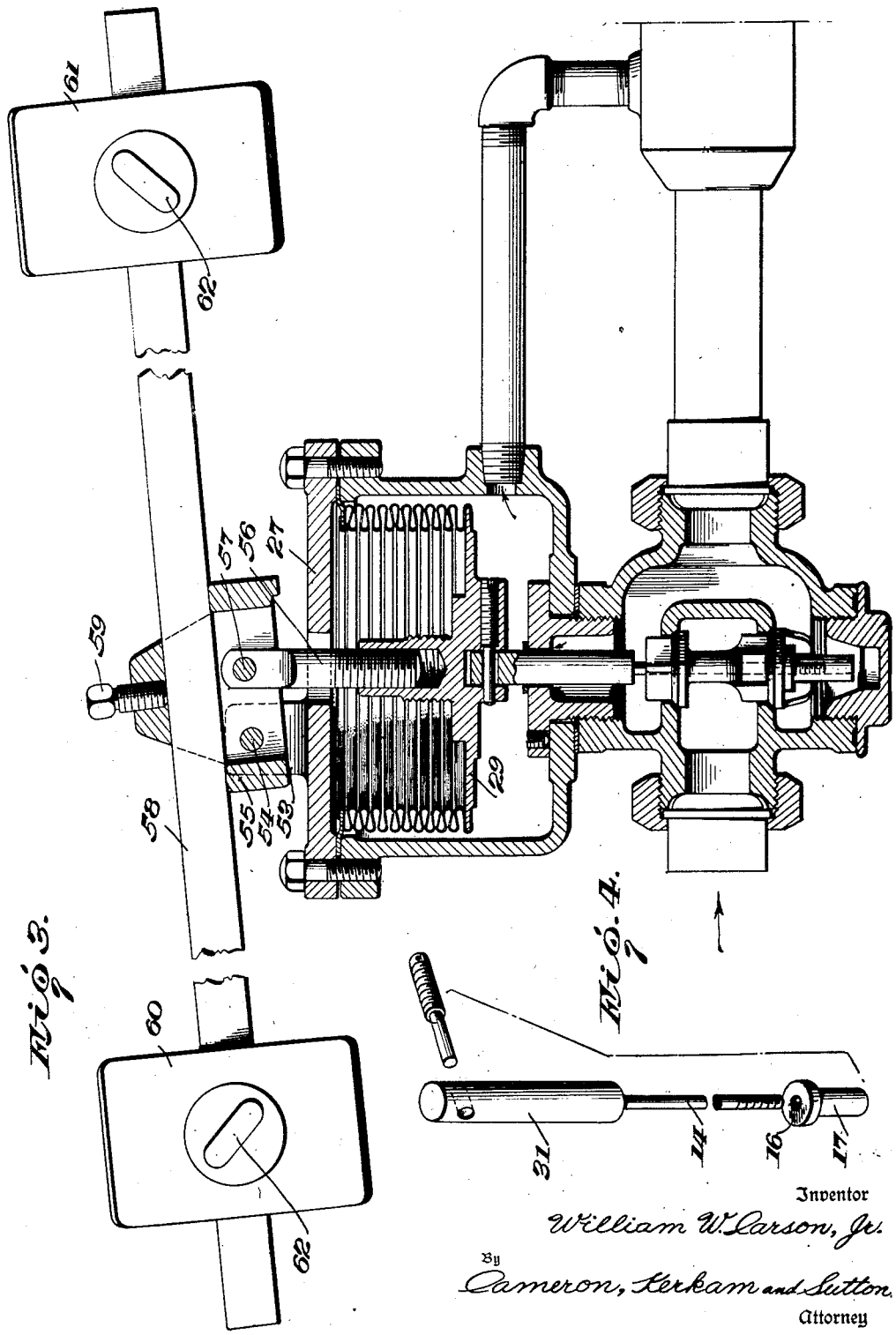

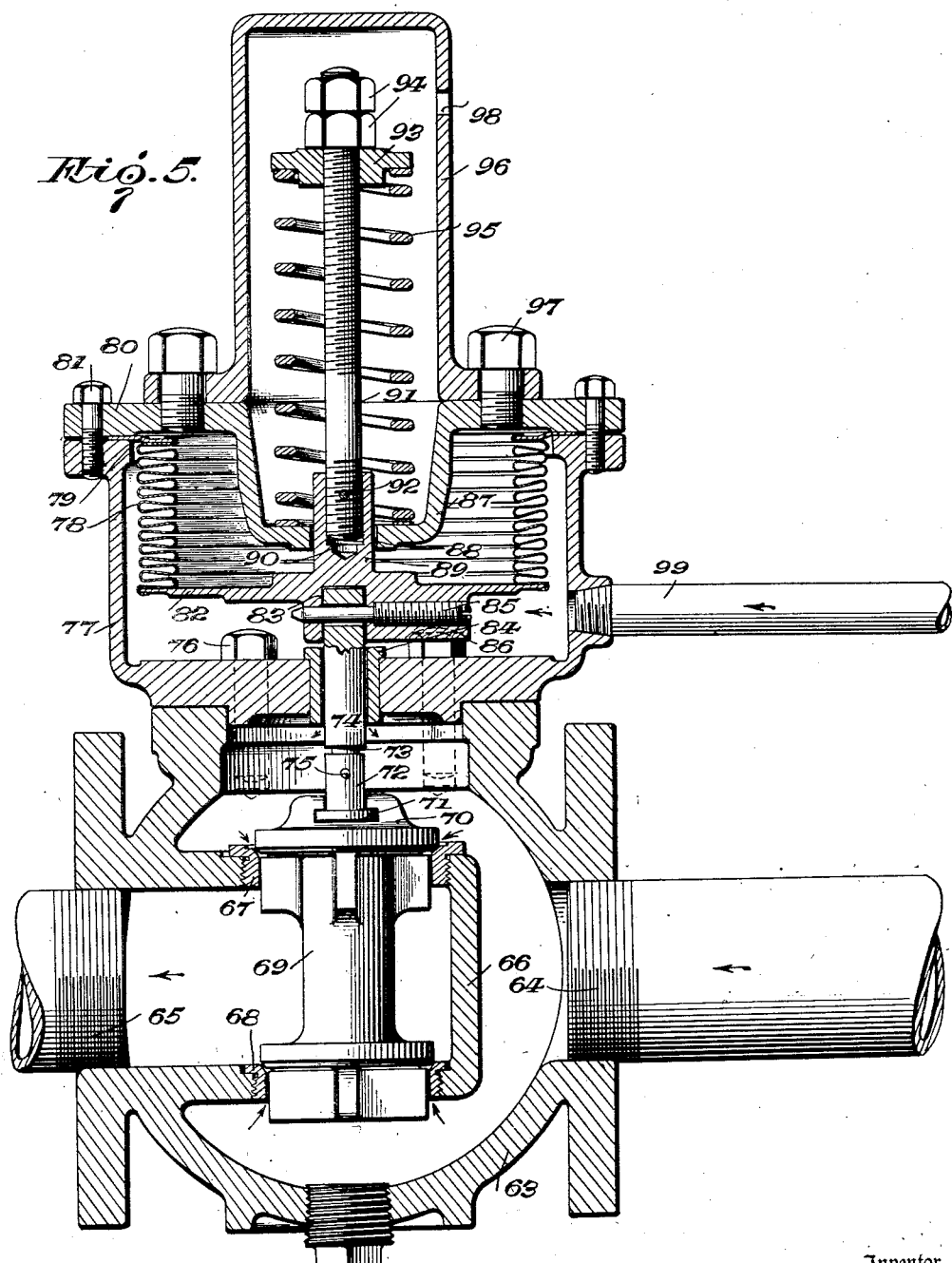

Patented July 11, 1933

1,917,698

UNITED STATES PATENT OFFICE

WILLIAM W. CARSON, JR., OF KNOXVILLE, TENNESSEE, ASSIGNOR TO THE FULTON SYLPHON COMPANY, OF KNOXVILLE, TENNESSEE, A CORPORATION OF DELAWARE

PRESSURE CONTROLLED VALVE

Application filed October 8, 1928. Serial No. 311,205.

This invention relates to reducing valves, and more particularly to a reducing valve whereby the initial pressure may be reduced to an effective value which is above, equal to, or below atmospheric pressure.

Devices of this character heretofore proposed have generally comprised a valve operatively connected with a suitable diaphragm or other pressure controlled element, which element is arranged to be subject to the pressure which is to be controlled and at the same time to an adjustable load acting in opposition to said pressure. Such devices as heretofore suggested, however, have been open to more or less serious objections such as the complexity of the mechanism employed, inaccessibility of parts for repair or replacement, excessive friction and wear caused by pressure-tight packing along the valve stem, etc., inflexibility of adjustment, particularly in that it has generally been impossible in devices heretofore known to set the same to maintain pressures either above or below atmospheric pressure regardless of the initial pressure, and many others.

One of the objects of this invention is to provide a novel reducing valve having a single adjusting means which may be set to maintain pressures either above, equal to or below atmospheric pressure.

Another object is to provide an improved reducing valve wherein all friction packing is eliminated and consequent loss of efficiency and wear are avoided.

A further object is to provide an improved reducing valve wherein all parts are readily accessible for adjustments, repairs or replacements.

A still further object is to provide an improved reducing valve of few parts and simple, economical construction while having reliability and efficiency in operation.

Other objects will appear hereinafter as the description of the invention proceeds.

The invention is capable of receiving a variety of mechanical expressions, some of which are shown in the accompanying drawings, but it is to be expressly understood that the drawings are for purposes of illustration only and are not to be construed as a definition of the limits of the invention, reference being had to the appended claims for this purpose.

In said drawings,—

Fig. 1 is a sectional elevation of an embodiment of the invention;

Fig. 2 is a perspective view of a part of the moving elements of Fig. 1;

Fig. 3 is a sectional elevation of another embodiment of the invention;

Fig. 4 is a perspective view of a part of the mechanism of Fig. 4; and

Fig. 5 is a sectional elevation of a further embodiment of the invention.

Referring now to Figs. 1 and 2, 1 is a valve casing of any suitable size, construction and material, provided with a suitable inlet opening 2 and outlet opening 3. As shown, an inlet pipe 4 having a flange 5 is clamped to the inlet opening 2 by means of a clamping ring 6, and an outlet pipe 7 having a flange 8 is clamped to the outlet opening 3 by means of a clamping ring 9. The casing 1 is provided with a suitable partition 10, preferably having a pair of valve openings 11 and 12, and mounted for cooperation with said openings is a double poppet valve 13 of any suitable type. The valve mechanism so far described is of well known construction and has been illustrated as typical of any suitable valve mechanism for controlling the flow of a fluid such as water, steam, air, etc.

The initial pressure in the inlet pipe 4 is reduced through the valve 13 to a desired value in the outlet pipe 7, which value may be determined by the adjustment of means to be described hereinafter. For this purpose the valve 13 may be connected in any suitable way with the valve operator, and as shown, is provided with a central longitudinal opening through which extends a valve stem 14. The lower end of the valve 13 is provided with a plurality of depending arms 15, which arms are bent under the flanged head 16 of a nut 17 engaging the end of the valve stem 14. By rotating the nut 17, the valve stem 14 may be adjusted with relation to the valve 13, and preferably the lower part of the valve casing 1 is provided with an opening 18 normally closed by a plug 19 which may be removed to render the nut 17 accessible.

Any suitable or known type of diaphragm, mounted in any suitable manner so as to be subjected to the pressure to be regulated, may be employed for operating the reducing valve 13. In the form shown, a housing or bowl 20 is securely mounted on the valve casing 1, being preferably clamped thereto by means of a flanged clamping stud 21 threaded at 22 in the valve casing, and provided with suitable means such as set screw 23 for preventing the bowl 20 from turning. A gasket 24 may be interposed between the bowl 20 and the casing 1 if desired. A suitable diaphragm extends across the bowl 20 and forms therewith a chamber which is suitably connected to the point at which the pressure is to be controlled. In the form shown, said diaphragm takes the form of a flexible corrugated wall 25 provided at one end with an annular head 26 which is clamped to the rim of the bowl 20 in any suitable manner, as by means of a cap 27 and cap screws 28. The other end of the flexible wall 25 is suitably attached as by means of soldering to a movable head 29, which head constitutes the pressure controlled element and is adapted to be operatively connected with the valve 13. Preferably, the connecting means employed are such as to be readily disconnectible, and to this end the head 29 is provided with a recess 30, and valve stem 14 is provided with an enlarged portion 31 which passes loosely through an opening 32 in the stud 21 and extends into the recess 30. A pin 33 is threaded in a boss 34 formed on the head 29, and is provided with a smooth end 35 extending diametrically across the recess 30 and passing through valve stem 31. Thus the movable head 29 is rigidly connected with the valve 13 so as to control the movement of the latter, but by removing pin 33 the connection is broken and either element may be separately removed, replaced, etc., without interfering with the other.

The space enclosed between the bowl 20, flexible wall 25, and movable head 29, constitutes an enclosed pressure chamber to which fluid from the low pressure side of the valve 13 may leak past the portion 31 of the valve stem, due to the small clearance provided between said portion 31 and the opening 32 in stud 21, or the portion 31 of the valve stem may be grooved or serrated as necessary. The pressure within the said chamber which acts on the diaphragm head 29 is therefore the reduced pressure on the low pressure side of the reducing valve, regardless of the initial pressure in the inlet pipe 4. If it is desired to control the pressure at a point removed from the valve, so that there is a pressure drop through the pipe 7 to the remote point, a feeler pipe 36 may be connected from the pressure chamber to the point at which the regulation is desired. There will be a slight flow from the pressure chamber to the remote point, which will be very small and will maintain the pressure within the chamber at approximately the same value as the pressure at the remote point.

For the purpose of adjusting the pressure which is to be maintained in the low pressure line 7, means preferably resilient, are provided for adjustably loading the diaphragm in opposition to the pressure within the chamber. In the form shown, the cap 27 is provided with a frame 37, in the outer end of which is provided an opening 38 through which passes freely a threaded tube 39. A spring plate 40 is threaded on the tube 39, being normally held from turning thereon by set screws 41, and a coil spring 42 is interposed between the plate 40, to which it is rigidly secured in any suitable manner, and the movable head 29 to which it is suitably secured as by means of a clamp nut 43 threaded on a boss 44 on the head 29. The spring plate 40 is prevented from turning in the frame 37 by means of projections 45 engaging the frame members, whereby when the set screws 41 are backed off and the tube 39 rotated, the spring plate 45 moves either up or down on the tube 39 and tensions or compresses the coil spring 42. Any suitable means for rotating the tube 39 may be provided, and as shown, an adjusting nut 46 is secured to the outer end thereof by means of a pin 47. Preferably, a thrust collar 48 is secured to the tube 39 in any suitable manner, as by means of solder 49. The tube 39 is normally held against rotation by friction. For guiding the diaphragm when necessary, the boss 44 may be provided with a threaded recess 50 in which engages a post 51 having a head 52 sliding in the tube 39.

As above stated, the pressure within the enclosed chamber is that of the remote point at which the pressure is to be regulated. This pressure tends to move the head 29 upwardly and to close the valve 13 which, as shown, closes as it moves upwardly. Opposed to the action of the pressure within the chamber is the atmospheric pressure on the opposite side of the head 29, together with the action of the spring 42. If the spring 42 is in compression, it will act together with atmospheric pressure tending to open the valve, and the pressure within the chamber necessary to close the same will be the sum of the atmospheric pressure plus the spring pressure. If, on the contrary, the spring 42 is tensioned, it will oppose the action of atmospheric pressure which tends to open the valve, and the pressure within the enclosed chamber which is necessary to close the valve will be the difference of atmospheric pressure and spring tension. Thus it will be apparent that by suitably adjusting the spring 42, the reducing valve may be set to maintain a pressure at the remote point which is either above or below atmospheric pressure, or equal thereto in case the spring 42 is neutral. The reducing valve is thus applicable not only to ordinary situations where a positive initial pressure in pipe 4 is reduced to a less but still positive pressure in pipe 7, but also to situations where an initial pressure in pipe 4 is reduced to a partial vacuum in pipe 7, as in vacuum heating systems.

Fig. 3 illustrates another embodiment of the invention wherein the diaphragm is controlled by means of weights instead of a spring. In this construction the valve assembly, housing or bowl, diaphragm, etc., may be the same as heretofore described in connection with Figs. 1 and 2. In this instance, however, the cap 27 carries a lug 53 to which is pivoted at 54 a rocker 55 of any suitable construction. The guide post 51 is replaced by a suitable post 56 which is operatively connected to the pivot 57 on the rocker 55. The rocker 55 carries a rocker arm or lever 58, suitably secured thereto as by means of a set screw 59, and carrying at either end weights 60 and 61 held in adjusted position by thumb nuts 62. By suitably adjusting the weights 60 and 61, the arm or lever 58 may be adjusted so that the rocker 55 tends to rotate either clockwise or counterclockwise about the rocker pivot 54, and so to push downward or pull upward respectively on the movable head 29. In the first instance the effect of the atmospheric pressure will be aided and the pressure maintained by the valve will be greater than atmospheric, and in the second case atmospheric pressure will be opposed and the pressure maintained by the valve will be less than atmospheric.

Fig. 5 illustrates an embodiment of the invention particularly designed for maintaining a reduced vacuum. For example, in vacuum can sealing machines, the vacuum pump which is employed may produce a greater vacuum than desired. In order not to limit the vacuum produced by the pump, but at the same time to limit the vacuum at the machine to a desired value, the reducing valve shown in Fig. 5 may be employed. As before, any suitable or desired type of valve may be used, which in the form shown comprises a suitable valve casing 63 provided with an inlet opening 64 and an outlet opening 65. A partition 66 in said valve casing is provided with a pair of openings in which are threaded valve seat rings 67 and 68, and cooperating therewith is a double poppet valve 69 which in this instance closes as it moves downwardly. The upper end of the valve 69 is provided with a plurality of arms 70 which are bent over the flanged head 71 of a nut 72, the latter being interiorly threaded to receive the reduced end 73 of a valve stem 74. A pin 75 prevents turning of the valve stem in the nut 72. The inlet opening 64 is connected to the sealing machine, and the outlet opening 65 to a suitable pump.

Secured to the casing 63 in any suitable manner, as by screws 76, is a bowl 77, and a diaphragm of any suitable type extends across said housing or bowl. In the form shown, said diaphragm comprises a flexible corrugated wall 78, having at one end an annular head 79 which is clamped to the bowl 78 by means of the cap 80 and screws 81. Secured to the other end of the wall 78 is a movable head 82, which is provided with a recess 83. Valve stem 74 passes loosely through a thimble 84 extending through the bottom of the bowl 77, and enters the recess 83, being held therein by the pin 85 threaded in the boss 86 formed on the head 82.

Any suitable means may be provided for loading the movable diaphragm, in the present instance being adapted to oppose the atmospheric pressure on the diaphragm. As shown, said means are resilient comprising a suitable coil spring which tends to move the diaphragm and valve upwardly and to open the valve. In the form shown, the cap 80 is provided with a central cup 87 having an opening 88 in its bottom, through which extends a post 89 preferably integral with the diaphragm head 82. Said post 89 has a recess or bore 90 which is threaded to receive one end of a rod 91, preferably pinned to said post at 92. The other end of said rod 91 is threaded and carries a spring plate 93, held in place by lock nuts 94, and a coil spring 95 is interposed between the spring plate 93 and the bottom of the cup 87. The compression of spring 95 may be adjusted by adjusting the spring plate 93, and said spring tends to lift the plate 93 and with it the diaphragm head 82 and valve 69. Preferably, the loading spring is enclosed by a cap 96, secured to cap 80 by means of cap screws 97, and provided with a suitable vent opening 98 whereby atmospheric pressure is admitted to the diaphragm head 82.

The pressure chamber enclosed by bowl 77, flexible wall 78, and head 82, is preferably connected by a pipe 99 with the point at which the pressure is to be controlled, such as the sealing machine hereinbefore referred to. The fluid in said chamber may leak through between the thimble 84 and valve stem 74 to the low vacuum or high pressure side of valve 69. The spring 95 opposes but its force is less than the atmospheric pressure acting on the head 82, and the resultant of the two forces therefore tends to close valve 69 against the pressure within the enclosed chamber. If the vacuum at the sealing machine becomes too high, the pressure within said chamber falls, and the reducing valve in the line to the vacuum pump closes partially until the pressure at the machine builds up and the vacuum falls, whereupon the increased pressure in the enclosed chamber opens the valve further, and so on.

It will be seen that the invention illustrated by the above embodiments provides a reducing valve which possesses many advantages. For example, the construction is such that the valve is readily adjustable to maintain constant pressures which are either above or below atmospheric pressure, due to the means provided for loading the diaphragm with a force which may act in either of two directions to either aid or oppose the atmospheric pressure on the exterior of the diaphragm. This feature is important in that it provides a single structure which may be manufactured in quantities and employed for different types of service, instead of being capable of fulfilling only one kind of service. The construction is rugged and durable in operation, efficient, and reliable, and yet requires a minimum of parts and reduces manufacturing cost to a minimum. Moreover, the structure is so designed that all adjustments may be made with facility, all parts are readily accessible for inspection, repair or replacement, and the operating connections between the main elements are such that one may easily be removed without interfering with the installation of the others.

While several embodiments of the invention have been illustrated in the accompanying drawings and described, it is to be expressly understood that these embodiments are for purposes of exemplification only, and it will be apparent that the invention is capable of a wide variety of mechanical expressions, many of which will now appear to those skilled in the art, and that changes may be made in the form, details and arrangement of the parts without departing from the spirit of the invention. Reference is therefore to be had to the appended claims for a definition of the limits of the invention.

What is claimed is:

1. A device of the class described comprising a body, a valve, a diaphragm operatively connected with said valve and forming with said body a pressure chamber, means subjecting said chamber to the pressure to be controlled, a single spring for loading said diaphragm and positively connected thereto at one end, and a single element to which the opposite end of said spring is positively connected, said element being adjustable to place said spring under either a predetermined tension or a predetermined compression.

2. A device of the class described comprising a body, a valve, a diaphragm operatively connected with said valve and forming with said body a pressure chamber, said diaphragm being exposed to atmospheric pressure, means subjecting said chamber to the pressure to be controlled, a single spring positively connected to said diaphragm for loading the same, and a single adjustable element to which the opposite end of said spring is positively connected and which is predeterminately adjustable to aid or oppose said atmospheric pressure.

3. In a device of the class described, a valve body, a valve in said body having a plurality of arms, a housing secured to said body, a diaphragm extending across said housing, a valve stem operatively connected to said diaphragm at one end and passing through said body and into said housing, and a nut for retaining said valve on the other end of said valve stem, said nut being rotatably mounted on said valve and retained thereon by said arms and said valve body being provided with a normally closed opening adjacent said nut.

4. A device of the class described comprising a valve body, a housing secured thereto, a valve in said body, a valve stem passing through said body and into said housing, a diaphragm extending across said bowl, said diaphragm and housing constituting a chamber subjected to the pressure to be controlled, means operatively connecting said diaphragm and valve stem, a single spring external to said chamber attached to and loading said diaphragm, a rotatable but axially immovable element carried by said housing, and a member mounted on said element and attached to said spring whereby said spring is predeterminately adjustable to aid or oppose the action of atmospheric pressure on said diaphragm.

5. A device of the class described comprising a valve body, a housing secured thereto, a valve in said body, a valve stem passing through said body and into said housing, a diaphragm extending across said housing, said diaphragm and housing constituting a pressure chamber subjected to the pressure to be controlled, means operatively connecting said diaphragm and valve stem, spring means positively connected to said diaphragm and external to said chamber for loading said diaphragm, a threaded tube carried by said housing, means connected to said diaphragm and cooperating with said tube to guide the movements of said diaphragm, and a member on said tube cooperating with said spring to adjust the same to aid or oppose the action of atmospheric pressure on said diaphragm.

6. A device of the class described comprising a valve body, a housing secured thereto, a valve in said body, a valve stem passing through said body and into said housing, a diaphragm extending across said housing, said diaphragm and housing constituting a chamber subjected to the pressure to be controlled, means operatively connecting said diaphragm and valve stem, a frame carried by said housing, a threaded tube rotatable in said frame, means for rotating said tube, an adjustable spring plate carried on said tube, and a coil spring positively attached at one end to said diaphragm and at the other end to said spring plate.

7. A device of the class described comprising a valve body, a housing detachably secured thereto, a valve in said body, a valve stem passing through said body and into said housing, a flexible corrugated wall secured to the rim of said housing and having a movable head, said housing, wall, and head constituting a pressure chamber subjected to the pressure to be controlled, means operatively connecting said head and valve stem, means external to said chamber for loading said flexible wall, and means for adjusting said last named means to aid or oppose the action of atmospheric pressure on said flexible wall, said loading means comprising a member positively connected to said flexible wall and said adjusting means including a single member connected to said loading member and movable to impose on said flexible wall either a predetermined pull or a predetermined push.

8. A device of the class described comprising a body, a valve therein, a housing detachably connected to said body, an expansible and collapsible corrugated wall attached to said housing and forming with said housing a pressure chamber, means subjecting said chamber to the pressure to be controlled, means connecting said wall to said valve, a frame carried by said housing, a threaded element rotatable but axially immovable in said frame, an adjustable plate mounted on said threaded element, and a spring positively connected to said plate and said wall.

9. A device of the class described comprising a body, a valve therein, a housing detachably connected to said body, an expansible and collapsible corrugated wall attached to said housing and forming with said housing a pressure chamber, means subjecting said chamber to the pressure to be controlled, means connecting said wall to said valve, a frame carried by said housing, a rotatable but axially immovable tube carried by said frame, means on said wall cooperating with said tube to guide the movements of said wall, a plate adjustably mounted on said tube, and a spring interposed between and positively connected to said plate and said wall.

10. A device of the class described comprising a body, a valve therein, a housing detachably connected to said body, an expansible and collapsible corrugated wall attached to said housing and forming with said housing a pressure chamber, means subjecting said chamber to the pressure to be controlled, means connecting said wall to said valve, a frame mounted on said housing, an adjustable element movable in said frame, and a spring positively connected to said wall and to said adjustable means and predeterminately placed under tension or compression by the adjustment thereof.

In testimony whereof I have signed this specification.

WILLIAM W. CARSON, Jr.